United States Patent
Frey et al.

(10) Patent No.: US 12,499,030 B2
(45) Date of Patent: Dec. 16, 2025

(54) TRACING TARGET METHODS USING CUSTOMER CONFIGURABLE REFLECTION CHAINING

(71) Applicant: Oracle International Corporation, Redwood Shores, CA (US)

(72) Inventors: Jeffrey Frey, San Mateo, CA (US); Ananya Krishnaswamy, Fremont, CA (US); Kunal Kapur, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 227 days.

(21) Appl. No.: 18/332,114

(22) Filed: Jun. 9, 2023

(65) Prior Publication Data

US 2024/0411664 A1 Dec. 12, 2024

(51) Int. Cl.
*G06F 11/34* (2006.01)
*G06F 9/445* (2018.01)

(52) U.S. Cl.
CPC ...... *G06F 11/3466* (2013.01); *G06F 9/44505* (2013.01)

(58) Field of Classification Search
USPC .................................................. 717/124–135
See application file for complete search history.

(56) References Cited

U.S. PATENT DOCUMENTS

| | | | | |
|---|---|---|---|---|
| 8,966,464 | B1* | 2/2015 | Christopher | G06F 11/3442 717/166 |
| 2010/0287541 | A1* | 11/2010 | Saunders | G06F 11/3466 717/139 |
| 2014/0173571 | A1* | 6/2014 | Gluck | G06F 21/54 717/130 |
| 2015/0121533 | A1* | 4/2015 | Gluck | G06F 11/3604 726/25 |
| 2017/0250890 | A1* | 8/2017 | Puls | G06F 11/3688 |
| 2018/0032328 | A1* | 2/2018 | Kannamparambil | G06F 8/75 |
| 2019/0036544 | A1* | 1/2019 | Young | H03M 7/60 |
| 2022/0019511 | A1* | 1/2022 | Marcin | G06F 11/3644 |
| 2022/0350725 | A1* | 11/2022 | Lydick | G06F 8/48 |

OTHER PUBLICATIONS

"What is OpenTelemetry?", May 22, 2023, <https://www.ibm.com/think/topics/opentelemetry>, p. 1-11. (Year: 2023).*
"OpenTelemetry", Retrieved from https://opentelemetry.io/, Retrieved on Sep. 12, 2023, pp. 3.

(Continued)

*Primary Examiner* — Qing Chen
(74) *Attorney, Agent, or Firm* — Invoke (57) ABSTRACT

Techniques for using user configurable reflection operations to access layered information are disclosed. A user may identify a method and type to be monitored in an application in a configuration file that is uploaded to the APM agent. The APM agent parses the configuration file to determine the method and type to be monitored and to identify any trace method. The APM agent may configure an execution environment to invoke a trace method upon the invocation of a target method. The trace method may execute a reflective operation and/or chained reflective operations to collect and report application information.

21 Claims, 6 Drawing Sheets

(56) References Cited

OTHER PUBLICATIONS

"Oracle Cloud Infrastructure Documentation", Retrieved from https://docs.oracle.com/en-us/iaas/application-performance-monitoring/doc/modify-probe-settings.html#GUID-F755BF9B-FC84-4EE7-A289-BD2FF09A4C9B, Jan. 24, 2023, pp. 23.

Sigelman B., "Towards Turnkey Distributed Tracing", Retrieved from https://medium.com/opentracing/towards-turnkey-distributed-tracing-5f4297d1736, Jun. 15, 2016, pp. 14.

\* cited by examiner

```
# For documentation on how to configure a Custom Probe using
DirectivesConfig.acml, visit https://docs.oracle.com/en-us/iaas/
application-performance-monitoring/doc/modify-probe-settings.html

# Once the value of the Custom Probe label below is set, it is not
recommended to change it. "test" is the example label included below.
If changed, restart of application server is required for directives
to be used.
# test:

# The below parameters are used to specify the class and method you
would like to monitor. Restart of your application server is required
for edits to these values to take effect.
# One of the parameters that are preceded by a * MUST be specified.
# * class_name:
# * class_name_regex:
# * class_annotation:
# * method_annotation:
# * class_annotation_regex:
# * method_annotation_regex:
#       method_name:
#       include_sub_classes:

# Restart of your application server is not required for edits to the
below values and sections.
#   span_name:
#   tags:
#   logs:
#   variables:
```

```
test:
    class_name: "com.test.beans.User"
    method_name: "incAge"
    span_name: "${short_class_name}.${method_name}"
    tags:
        t: "${this}"
        params: "${param1}"
        r: "${return}"
        # Variables (custom reflection chains in the variables section below) will only be added as span tags (and only visible on the UI) if they are referenced in this section
        # You can specify what type (integer, double, float, boolean, String) the value of the span tag should be. Default is String.
        chainTagInt: "${chain} | integer"
        chainTagString: "${chain}"
        longCommandChain: "${longCommandChain}"
        # The other variables after longCommandChain can also be included as tags in similar syntax as the above, but are omitted for brevity
    logs:
        # custom span log
        chainLogAddress: "${chainVarTestLog}"
    variables:
    # Simple chain
    chain: before this | method (public getAge())

# Command chain starts with User object, first chain command returns an address, second chain command returns a street of that address "Downing Street", third chain command (regex command 1) replaces all instances of "ing" with "UnderUnder" and returns "DownUnderUnder Street", last chain command (regex command 2) replaces the first instance of "UnderUnder" with "Under". We are left with the string "DownUnder Street" as the output of this chain
        longCommandChain: this | method (public getAddress ()) | field(private street) | regex(ing, UnderUnder, all) | regex(UnderUnder, Under, first)

# Other SOIs
            returnSOI: after return | method (public getAddress ())
            paramSOI: before param1 | method (public getAddress ())
```

```
        # use variable as starting object
        var1: this | method (public setNewAddress (string "Variable Street", string
"Redwood   City", string "California", int 94065, string "US"))

var1UsedAsStartObject: after var1 | method (public getAddress ()) |
field(private street)

# setup variable to be used in subsequent chains
        testSetupVar: this | method(public incUserId(param1))
        testVarAsParam: this | method(public incUserId(testSetupVar))

# invoke base class private method
        methodPrivateBase: this | method(getPrivateUserId())

# invoke base class public method
        methodPublicBase: this | method (public getFirstName())

# invoke superclass protected method
        methodProtectedSuper: this | method(protected getBonus())

# test accessing base class protected field
        fieldProtectedBase: this | field(protected dept)

# test accessing super class public field
        fieldPublicSuper: this | field(public familyName)
        variableTestField: this | field (private lastName)

# test overloaded methods
        overloadMethod1: this | method(public overloadPublic(String "string1", int
1111))
        overloadMethod2: this | method(public overloadPublic(double 22.22, String
"string2",    float 11.11))

# invoke super method explicitly
        invokeUsingSuper: this | method(private super.overloadPrivate(String
"string3", int    2222))

# variable used to test custom span log
        chainVarTestLog: before this | method(public getAddress())
```

TRACING TARGET METHODS USING CUSTOMER CONFIGURABLE REFLECTION CHAINING

TECHNICAL FIELD

The present disclosure relates to systems and methods for monitoring application performance. In particular, the present disclosure relates to the use of customer configurable reflection chaining for tracing target methods.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

An application performance monitor (APM) system is a set of tools and processes used to monitor and manage the performance of software applications. APM systems are used by developers, DevOps engineers, and IT operations teams to ensure that applications are running smoothly and delivering optimal performance. By monitoring and managing application performance with APM tools, organizations can proactively identify and resolve issues before they impact users or cause business disruption. An APM system collects data about the performance of an application, analyzes that data, and presents the data in a way that is useful to developers and operations teams.

Out-of-box, APM systems are configured to monitor various industry standard technologies found in most any application server, for example, Servlets, Http Clients, JDBC Calls. By default, APM systems generally capture a type/method name, the timing of the method, and if an exception is thrown. Additional configurations may permit capturing of method parameters, return values, and the object being monitored. APM systems typically capture a string representation of the objects. The string representation of the objects may or may not provide a customer sufficient information to diagnose or troubleshoot an issue. Some information may be buried several layers deep within an object and inaccessible using traditional APM systems.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 4A and 4B illustrate an example configuration file for invoking a trace method.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. APPLICATION PERFORMANCE MONITORING SYSTEM ARCHITECTURE
3. USING REFLECTIVE OPERATIONS TO ACCESS LAYERED DATA
4. EXAMPLE DEFAULT USER CONFIGURABLE CONFIGURATION FILE
5. EXAMPLE USER CONFIGURABLE CONFIGURATION FILE
6. COMPUTER NETWORKS AND CLOUD NETWORKS
7. HARDWARE OVERVIEW
8. MISCELLANEOUS; EXTENSIONS

1. General Overview

One or more embodiments configure a trace method, including performance of reflective operations, to be invoked by an execution environment when a target method is invoked. The trace method and/or target method may be identified by analyzing a user-defined configuration file that is accessible to an application monitoring agent. The application monitoring agent detects a target method in a type (e.g., a Java class) being loaded into an execution environment. Detecting the target method may include detecting the target method as a method of a particular target type. In response to the detection of the target method, the application monitoring agent configures the execution environment to invoke a trace method upon invocation of the target method. Configuring the invocation of the trace method may include injecting bytecode into the bytecode of the application. Bytecode may be injected into the code of the application at a start and/or end of the target method.

Some embodiments configure the execution environment to invoke the trace method in response to and subsequent to determining that the trace method meets a trace execution criteria. The system may evaluate characteristics and/or expected output of the trace method to determine whether the trace method meets the trace execution criteria. As an example, the trace execution criteria may require that instructions or a command for configuring the trace method specify a type(s) that includes the target method. The specification of a particular type(s) ensures that a trace method is not configured for every detected instance of the target method in any type, rather the trace method is configured only for the target method when the target method is detected within the particular specified type(s). The trace execution criteria may require specific estimated characteristics of a dataset to be generated by the trace method. For example, the trace execution criteria may require that an estimated size of a dataset to be generated by execution of the trace method is below a threshold size.

One or more embodiments configure the invocation of a trace method that executes a reflective operation and/or a chain of reflective operations. Executing a reflective operation includes accessing an object returned by the target method and executing the reflective operation on the returned object. Performing a reflective operation on the return object allows a user to obtain more specific information or information contained deeper within the object. For example, the target method may be in a holder or container class that holds everything related to the call in a single object. A call to present a string representation of the object would result in a large dump of information and/or unnecessary or useless information. By performing a reflective operation on the object returned by the target method of the container class, a user can target specific information within the object. Additionally, as will be described in further detail below, a reflective operation may be performed to triage or redact information, e.g., confidential or classified information. Chained reflective operations may include performing a second reflective operation on the result of a first reflective operation. Performance of the second reflective operation allows the user to get a layer deeper in the object and/or to manipulate the information. In some embodiments chained reflection operations may be performed on the result of the previous reflection operation until a desired result is obtained or until there is no return value generated from the current reflective operation.

One or more embodiments described in this Specification and/or recited in the claims may not be included in this General Overview section.

2. Application Performance Monitoring System Architecture

Figure 1:
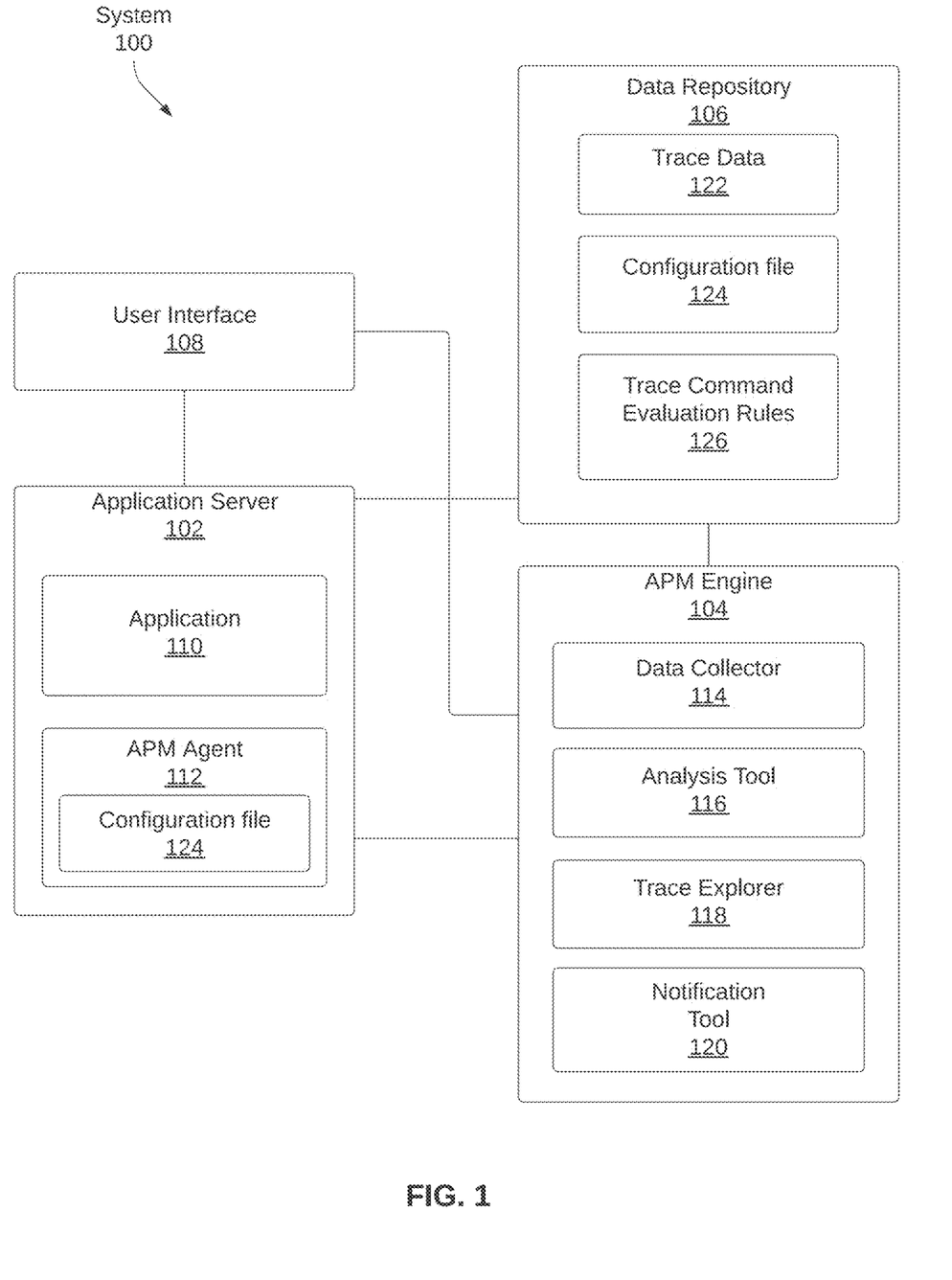
FIG. 1 illustrates a system in accordance with one or more embodiments.

FIG. 1 illustrates a system 100 in accordance with one or more embodiments. As illustrated in FIG. 1, application performance monitoring (APM) system 100 includes an application server 102, an APM engine 104, a data repository 106, and a user interface 108. In one or more embodiments, the APM system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In some embodiments, the application server 102 is a software program or a hardware system that provides a platform for hosting and executing web applications. In one or more embodiments, the application server runs on a dedicated server machine and provides a middleware layer between a web server, which handles HTTP request from clients, and the backend database or other data storage system. Examples of web servers include Oracle WebLogic Server, Apache Tomcat. Non-Java web servers include Apache HTTP Server, Nginx, Microsoft Internet Information Services (IIS).

In some embodiments, the application server 102 performs various functions including hosting web applications, managing application components, scaling and load balancing, and interfacing with backend systems. The application server may be designed to host web applications written in various programming languages, such as Java, Python, .NET, and Ruby. In some embodiments the application server 102 provides a runtime environment and other services necessary for executing code and serving content to clients.

In some embodiments, the application 110 running on the application server 102 is a business application. The application 110 may include web applications, mobile applications, cloud-based applications, enterprise applications, and/or database applications. Web applications are applications that run on web servers and are accessed through a web browser. Web applications include, for example, online shopping sites, social media platforms, and web-based email services. Mobile applications are applications that run on mobile devices such as smartphones and tablets, and include, for example, games, productivity apps, and social media apps. Cloud-based applications are applications that run on cloud infrastructure, such as Amazon Web Services (AWS), Microsoft Azure, Oracle Cloud Infrastructure, or Google Cloud Platform (GCP), and include for example, cloud storage service, cloud-based analytics platforms, and cloud-base software-as-a-service (SaaS) applications. Enterprise applications are applications designed to support operation of a business, and include, for example, enterprise resource planning (ERP) systems, e.g., Oracle Business Suite, Oracle Fusion Applications, PeopleSoft, customer relationship management (CRM), and supply chain management systems. Database applications are applications that interact with a database, and include data warehousing and business intelligence (BI) applications.

In some embodiments, the APM agent 112 is provisioned on the application server 102. Although typically provisioned on the same machine as the application server 102, the APM agent 112 may be installed on a machine separate from the application server 102. The APM agent 112 is a software component that monitors the performance of the application 110. In one or more embodiments, the APM agent 112 collects performance data and metrics about the server, such as response times, throughput, and error rates. The APM agent 112 integrates with the application server 102 and captures data by monitoring various components of the application 110, including transactions, method calls, and database queries. In some embodiments, the data collected by the APM agent 112 is sent to the APM engine 104 where a data collector 114 collects the data, an analysis tool 116 analyzes the data, and a trace explorer 118 arranges the analysis for display in a user friendly manner. In one or more embodiments the trace explorer 118 causes display of the performance data on the user interface 108.

In some embodiments the APM agent 112 includes an agent binary that is deployed on the application 110. In embodiments, the agent binary is a small, lightweight program installed on the application server 102 to collect and report data about the performance, health, and other metrics of the application 110. In some embodiments the agent binary includes agent code and agent runtime. Agent code is the core functionality of the agent binary, which performs the specific task or function for which the agent was designed. In some embodiments, the agent binary includes code to collect data about the performance of the target application. Agent runtime is the supporting code that allows the agent code to run on the target system. The agent runtime typically includes libraries, drivers, and other system-level components that are necessary for the agent code to function properly.

In some embodiments, the agent binaries are designed to be platform-specific, meaning that they are compiled to run on a specific operating system and hardware architecture. This allows the agent binary to take advantage of the specific features and capabilities of the target system. For example, an agent binary designed for a Linus server may include code that interacts with the Linux kernel to collect data about system resources.

In some embodiments, the APM agent 112 utilizes bytecode weaving to modify the bytecode of the application 110. Bytecode weaving is a technique used to modify the bytecode of an application at loadtime, to add instrumentation or tracing functionality to the code. In some embodiments, bytecode weaving in Open Tracing and Open Telemetry APIs is accomplished using libraries such as AspectJ or ByteBuddy or ASM. These libraries allow developers to write custom instruction code, which is then woven into the bytecode of the application at runtime. By using bytecode weaving to automatically instrument application code, Open Tracing and Open Telemetry APIs are able to provide detailed tracing and telemetry data without requiring developers to manually modify the application code. This is particularly useful for older applications that can no longer be updated and for less common libraries or customer specific applications for which traditional APM systems are not configured to monitor. The bytecode weaving to inject tracing code into application bytecode is performed as the application code is loaded into the execution environment. In this manner, any change requiring additional bytecode weaving requires rebooting of the application server 102.

In the some embodiments, the APM agent 112 utilizes ASM in combination with Open Tracing and Open Telemetry APIs to perform bytecode weaving to automatically instrument the application code to generate traces and other telemetry data and/or to make a simple call to the APM agent to execute a trace method. ASM is a Java bytecode manipulation library that provides a set of API's for reading, writing, and modifying bytecode at runtime. ASM is designed to be fast and lightweight, making ASM well-suited for use in high-performance applications and frame. ASM allows developers to write bytecode manipulation code at a low level, by directly working with the binary representation of bytecode instructions.

In a traditional APM agent, the ASM provides bytecode weaving for a default set of types and methods. Although capable of monitoring every step in an application, the amount of information produced would be essentially useless and/or would monopolize application resources. This is especially true in cloud environments, where sending large amounts of information is impractical for network bandwidth reasons, and the use of overhead. Further, traditional APM agents do not permit user selection of particular type and method to monitor.

Although many of the aspects shown and described herein may relate to Java specific applications, the aspects of the disclosure are applicable to applications in other languages, including, for example, .NET, Ruby, Python.

In some embodiments, the APM agent 112 includes one or more libraries. One library includes a configuration directory where a configuration file 124 is maintained. In embodiments, the configuration file 124 is in an ACML format that specifies which types, methods, or annotations of the application 110 the APM agent 112 is to monitor. In some embodiments, the configuration file 124 is in a YAML (short for "YAML Ain't Markup Language") format. YAML is a human-readable data sterilization format commonly used for configuration files and data exchange between applications. YAML is often used in web applications, DevOps tools, and other contexts where configuration files are used to specify setting or parameters. YAML is designed to be easy for humans to read and write, and its syntax is meant to be concise and intuitive.

In some embodiments, the configuration file 124 enables a user to define a target type and method for monitoring. In one or more embodiments, the target type is a class. As will be described in further detail below, the configuration file 124 may also identify variables. The variables may include a trace method in the form of command syntax and command chain syntax that is executed using reflection APIs when the target method is invoked. In some embodiments the configuration file 124 is referenced by the APM agent 112 prior to loading of the application into the runtime environment to identify the target type and method to monitor. As such, any edits to configuration file 124 that modify the target type and/or method to be monitored require restart of the application server 102. In some embodiments the APM agent 112 also references the configuration file 124 at the start and finish each time the target method is invoked, to identify the parameters to be captured and the trace method to be executed. Edits to the configuration file 124 that modify the tags and logs to be captured or the trace method take effect immediately and without restarting of the application server 102.

In an example configuration file, parameters that may be specified include label, class_name, class_name_regx, class_annotation, method_name, method_annotation, class_annotation_regex, method_annotation_rex, include_sub_classes, span_name, tags, logs. Label is a unique label for the directive and is a mandatory parameter. Class_name is the class to be monitored. In embodiments the full class name need be specified. Class_name_regex is a regular expression (regex) pattern to monitor any class that it matches. If both class_name_regex and class_name are specified, then class_name is ignored. Class_annotation is the full class name of the annotation to monitor. Any class with the specified annotation is monitored. Method_name is the name of the method to be monitored. This does not include method parameters. If method_name is not specified, then all methods are monitored. Method_annotation is the full class name of the annotation to be monitored. Any method with the specified annotation is monitored. Class_annotation_regex is a regex pattern to monitor any class annotation that matches it. If both class_annotation_regex and class_annotation are specified, then class_annotation is ignored. Method_annotation_rex is a regex pattern to monitor any method that matches it. If method_name_regex is not specified, then all methods are monitored. If both method_name_regex and method_name are specified, then method_name is ignored. Include_sub_classes is specified if subclasses of the target class must be monitored. By default, this is set to false. Span_name is the name of a span created during monitoring. If the span_name is not specified, "$ {class_name}. $ {method_name}" is used by default. A name can be specified for the span and will be used every time the monitored target is invoked. When specifying the span_name parameter, variables and advance variables may be used to acquire additional information regarding the parameters that are being monitored and display the variables in the name of the span. Tags are the names and values to be included in the span. As with span_name parameter, variables may be used when specifying values for tags to acquire and display additional information regarding the parameters being monitored. For tag values, an optional type may be specified. For example, the tag value may be a type of String, Boolean, Integer, Long, Float, or Double by using the appropriate syntax and keyword. A default tag value type is String. The default tag value type will be used if no type or an incompatible type is specified. If an incompatible type is specified for a tag value, the type will revert to the default of String, and a log message about the incompatibility is created. Logs are names and values a user identifies for inclusion in the span. As in the case of the span_name and tags parameters, variables may be used when specifying values for the logs parameter to acquire and display additional information regarding the parameters being monitored.

In some embodiments identifying only the target method and type in the configuration file 124 provides a trace including only the timing of the method and any exception that might have been thrown at the finish.

In the above described example configuration file, when specifying the span_name, tags and logs parameters, the following variables may be used to acquire additional information, class_name, short_class_name, method_name, method_descriptor, param #, this, and return. Class_name is the name of the class being monitored, including the package. Short_class_name is the name of the class being monitored, excluding the package. Method_name is the name of the method being monitored. Method_descriptor is the descriptor format of the method's signature being monitored. Param # are parameters of the method being monitored, in which param1 denotes the first parameter, param2 the second parameter, and so on. "this" is the object being monitored. Note that if the method being monitored is static, then this variable will not be available. Return is the return value of the method being monitored. The return variable may only be used for the tags parameter and not for span_name.

An example configuration file including tags is provided below.

```
Test:
    class_name: "com.oracle.apm.samples.servlet.OutTestServlet"
    method_name: "performHttpURLConnectCall"
    include_sub_classes: true
    span_name: "${short_class_name}. ${method_name}"
    tags:
        targetURL: "${param2}"
        port: "${param1}"
```

In the above example configuration file, the type or class being monitored is "com.oracle.apm.samples.servlet. OutTestServlet", along with its subclasses. The name of the span that will be displayed in the trace is OutTestServlet.performHttpURLConnectCall. The targetURL and port tags are added to the span, and use the values of the first and second parameters of the performHttpURLConnectionCall method.

In some embodiments the configuration file 124 includes advance command syntax. Utilizing reflection APIs to execute the commands in the configuration file 124 allows for the dynamic construction of variables using method chaining and string manipulation via regular expressions. These advanced variables may be referenced in the span_name, tags, and logs sections, just like the other variables mentioned above.

In some embodiments, reflection APIs are used to invoke one or more methods defined in the advance command syntax of the configuration file. Reflection is a programming technique in which a program examines and modifies its own structure and behavior at runtime. Reflection allows a program to access information about itself, such as the names and properties of its types, methods, and fields, and to invoke methods and access fields dynamically. Reflection operations include retrieving type information, retrieving object instances, creating new instances, invoking methods, modifying fields, inspecting annotations, and implementing dynamic proxies. Reflection is often used in dynamic programming languages, such as Python, Java, and Ruby, and in frameworks that rely on metadata, such as JavaBeans and .NET.

In some embodiments the command syntax in the configuration file 124 includes chain commands. A chain command is a sequence of commands executed one after the other in a specific order. Each command in the chain uses the output of the previous command as its input. The output of the final command in the chain is the output of the entire chain. A chain command sequence includes one or more chain commands. Example syntax for a chain command sequence includes, <chain_command_seq>::=<chain_command>|<chain_command>|<chain_command_seq>

In some embodiments, there are three types of chain commands: method, field, and regex. Example syntax for the three types of chain commands includes, <chain_command>::=<method_command>|<filed_command>|<regex_command>

A method command is used to invoke a method. The output of a method command is the return object of that specific method. A field command is used to inspect field values. The output of a field command is the object in that specific field. A regex command is used to find and/or replace strings resulting from the starting object identifier (SOI), return values of the method commands, or the field values. The output of a regex command is a string.

In some embodiments the advanced command syntax is executed by the APM agent 112 at before and/or after invocation of the target method. As described in detail above, bytecode weaving is used to interweave bytecode of the APM agent 112 into the bytecode of the application 110 to place a simple call to the APM agent 112 at the start and finish of invocation of the target method. The call to the APM agent 112 triggers the APM agent 112 reference the configuration file to identify any command syntax, i.e., trace method, to execute.

In some embodiments the command chain syntax includes three parts, execution time, starting object identifier (SOI), and chain command sequence. The pipe symbol "|" may be used to signify piping the starting object to the first chain command and piping output object of one chain command to the next. In embodiments, the command chains are executed at the start and/or finish of the method being invoked. The timing is specified by the execution time which appears before the SOI, as shown in the below example.

<execution time>::=[before||after]

Not all command chains are compatible with both execution times. For example, when return is used as an SOI or as a parameter in a method command, the after execution time is required, as the return object is only available after the monitored method is invoked. When other variables are used as SOIs or parameters in method commands, execution times are dependent on the referenced chains. For example, when chain1 and chain 2 are defined, and chain2 uses chain1 as an SOI or parameter for a method command, chain1 must be defined before chain2 if both chains use the same execution time, otherwise chain1 must have an execution time before, and chain2 must have an execution time after.

In some embodiments, examples of SOI syntax includes, ThisSOI, executed on the object specified by class_name in the configuration file, ReturnSOI, executed on the object specified by return in the configuration file (return value of the method being monitored), ParamSOI, executed on the object specified by param # in the configuration file (parameters of the method being monitored), and VariableSOI, executed on the object specified by one of the above variables defined in the configuration file.

In some embodiments, the SOI may be objects associated with predefined keywords, e.g., this, return and param #, or output of a chain identified by its key. In embodiments execution times may be paired with SOI syntax.

An example configuration file including chain command syntax or trace method is produced below.

```
test:
   class_name: "com.test.beans.User
   method_name: "incAge"
   span_name: "${short_class_name}.${method_name}"
   tags:
      t: "${this}"
      params: "${param1}"
      r: "${return}"
      exampleVarTag: "${exampleVar}"
   variables:
      exampleVar: before this | method(public getAddress ( )) | field(private street) | regex(Pk, This, all) | regex(This, That, first)
```

In the example configuration file above, the example chain command syntax, example Var, starts with the User object which is specified in "class_name". The first chain command, method (public getAddress ( ), is a method command which returns an address object. For example, "100 Oracle Pkway, Redwood City, CA 94065" is the address object. The second chain command, field (private street), is a field command that gets the street of the address from the previous field command. In the example, "Oracle Pkway" is the street of the address from the previous field command. The third chain command, regex (PK, This, all), is a regex command that replaces all instances of "Pk" with "This" and returns "Oracle Thisway". The last chain command is a regex command that replaces the first instance of "This" with "That", returning "Oracle Thatway". The regex commands are useful for redacting or replacing information that is private or confidential.

In some embodiments, use of reflection APIs to invoke the methods identified in the command syntax and chain command syntax requires knowledge of the application source code. More importantly, a user is required to know what methods are available to capture the desired information and the return values of those methods.

In some embodiments the configuration file 124 is created and/or updated using a text editor. In some embodiments the configuration file 124 is created, uploaded, and/or updated through user interface 108. In one or more embodiments, the APM agent 112 may include more than one configuration file 124.

In some embodiments, the APM engine 104 is responsible for collecting performance data, analyzing the performance data, and providing insights and metrics to help optimize application performance. In one or more embodiments, the APM engine 104 is located on a cloud server remote from the application server 102. In one or more embodiments the APM engine 104 includes a data collector 114, an analysis tool 116, and a trace explorer 118, and a notification tool 120.

In some embodiments, the data collector 114 collects various types of data related to the application performance, including metrics such as response times, throughput, resource utilization, error rates, and transaction traces. The data collector 114 may gather data from different sources, such as application servers, web servers, databases, and network infrastructure.

In some embodiments, once the data is collected, the analysis tool 116 processes and analyzes the data to identify patterns, trends, anomalies, and performance issues. The analysis tool 116 applies algorithms, statistical analysis, and correlation techniques to the data to extract meaningful insights from the data.

In some embodiments, the trace explorer 118 is a tool or component used to visualize and analyze distributed traces. Distributed tracing is a technique used to monitor and trace the path of a request as it flows through a distributed system, capturing the interactions and timings between different components and services. In one or more embodiments, the trace explorer 118 provides a graphical interface for exploring and analyzing these traces in a user friendly manner, often through visual dashboards and reports. These visualizations assist stakeholders, including developers, operation teams, and business users, to better understand and interpret the performance metrics effectively. As will be described below, the visualizations may be displayed on the user interface 108. In some embodiments the trace explorer 118 allows users to view the entire trace, including all the services involved, the timing and duration of each segment, and any errors or exceptions that occurred. Users can also drill down into individual trace segments to see more detailed information about what happened at each step of the request/response cycle.

In some embodiments, the notification tool 120 generates alerts and notifications based on predefined thresholds or abnormal behavior detected in the performance data. The notification tool 120 assists teams to proactively identify and address performance issues in real-time.

In some embodiments, the data repository 106 is any type of storage unit and/or device (e.g., a file system, collection of tables, or any other storage mechanism) for storing data. Further, the data repository 106 may include multiple different storage units and/or devices. The multiple different storage units and/or devices may or may not be of the same type or located at the same physical site. Further, the data repository 106 may be implemented or may execute on the same computing system as the APM agent 112, APM engine 104, and user interface 108. Alternatively, or additionally, the data repository 106 may be implemented or executed on a computing system separate from the APM agent 112 and user interface 108. The data repository 106 may be communicatively coupled to the APM agent 112 and user interface 108 via a direct connection or via a network.

In some embodiments, the data repository 106 includes trace data 122, the configuration file 124, and trace command evaluation rules 126. In some embodiments the trace data 122 includes the spans collected by the data collector 114. As described in detail above, the configuration file 124 is used by the APM agent to identify a target method for tracing and may include a trace method for performing one or more reflective operation on the return of the target method.

In some embodiments, the trace command evaluation rules 126 include a set of rules for determining when an estimated characteristic of dataset generated by execution of a trace method in a configuration file 124 meets or exceeds a trace execution criteria. The estimated characteristics may include an estimated size of the dataset and/or an estimated amount of resources necessary to execute the trace method. For example, the trace command evaluation rule 126 may include configuring the execution environment to execute the trace method when an estimated characteristic of a dataset to be generated by execution of the trace method of the target method is below a threshold. Conversely, the trace command evaluation rule 126 may include refraining from configuring the execution environment to execute the trace method when an estimated characteristic of a dataset to be generated by execution of the trace method of the target method exceeds a threshold. By setting a threshold for an estimated characteristics of a dataset that would be generated by execution of the trace method and refraining from configuring the execution environment to execute the trace method when the estimated characteristic exceeds the threshold, a user is able to better prevent the excessive use of resources and/or overload of the application server 102.

In one or more embodiments, the user interface 108 refers to hardware and/or software configured to facilitate communications between a user and the APM agent 112, the APM engine 104, and the data repository 106. User interface 108 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of user interface 108 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, user interface 108 is specified in one or more other languages, such as Java, C, or C++.

In some embodiments, the user interface 108 is used to access an upload URL and to provide a private data key that enables provisioning of the APM agent 112 on the application server 102. In one or more embodiments the user interface 108 is used for updating or modifying the configuration file.

Additional embodiments and/or examples relating to computer networks are described below in Section 6, titled "Computer Networks and Cloud Networks."

3. Using Reflective Operations to Access Layered Data

Figure 2:
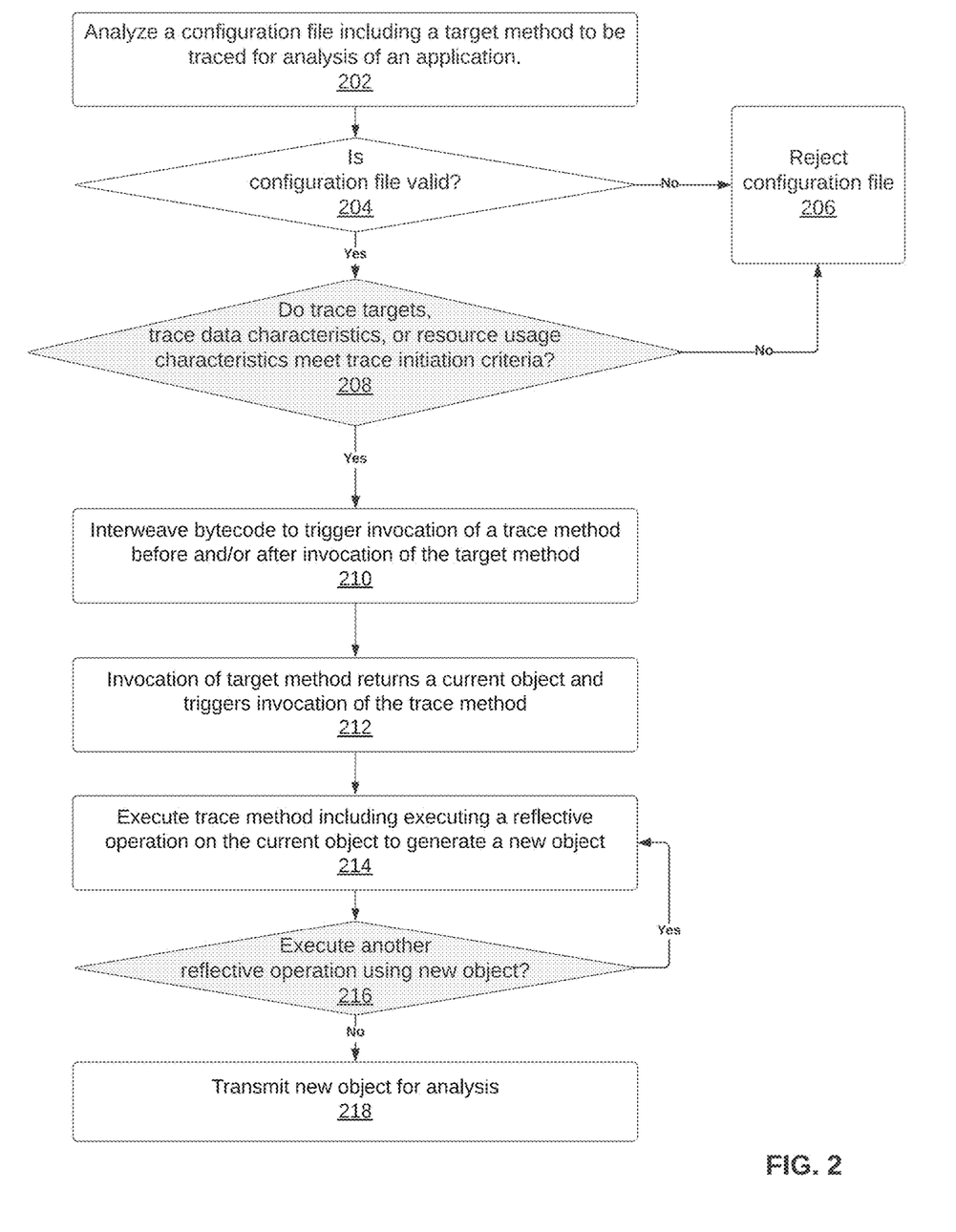
FIG. 2 illustrates an example set of operations for monitoring a target method in accordance with one or more embodiments.

FIG. 2 illustrates an example set of operations for using user defined reflection operations to access layered information in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

In some embodiments, an APM agent inspects a configuration file identifying a target method that is to be traced for analysis of an application (Operation 202). In some embodiments, the configuration file is maintained within a library, .e.g., configuration directory, of the APM agent. The configuration file may include a span name, a target method and type for tracing, one or more parameters to be traced, and/or advanced command syntax for dynamically constructing variables.

In one or more embodiments, the configuration file is modified by the user to identify a target method and type. As described above, any time the target method and type is modified in configuration file, the application server requires rebooting in order for the modification to the target method and type to take effect. In some embodiments, the configuration file is modified by the user to identify a name for the span and other information to be captured. A user may also modify the configuration file to identify a trace method in the form of advance command syntax. Modification to the span name and variables, including trace method, may be performed at any time and will have immediate effect. In one or more embodiments, reflection APIs are used to invoke methods identified in the advance command syntax to dynamically construct variables using method chaining and string manipulation via regular expressions.

In some embodiments, the APM agent parses the configuration file to determine if the configuration file is valid (Operation 204). In one or more embodiments a valid configuration file includes identification of a target method and identification of at least one additional parameter. The inclusion of at least one additional parameter is used as a safety to prevent overloading the system during execution of the target method. More particularly, when only a target method is identified, a trace is performed every time that target method is invoked, regardless of type. When the target method appears in more than one type, tracing each invocation of the method in every type may overload the application server. By requiring an additional parameter, the likelihood of the application server being overloaded is reduced. In an example performance monitoring system, the additional parameters that may be identified in the configuration file to prevent system overload include, class_name, class_name_regex, class_annotation, method_annotation, class_annotation_regex, and method_annotation_regex. In some embodiments, edits to any of these parameters, as well as to method_name and/or include_sub_classes, necessitate a restart of the application server to take effect, and edits to span_name, tags, logs, and variables do not require a restart of the application server to take effect.

In some embodiments, when the APM agent determines that a configuration file does not include at least one parameter in addition to the target method, the APM agent rejects the configuration file (Operation 206). Rejection of the configuration file may initiate a prompt to a user indicating rejection of the configuration file. In some embodiments, lack of at least one additional parameter may only illicit a prompt to the user informing the user of the potential for the system to be overloaded.

In some embodiments, after determining that the configuration file is valid, the APM agent analyzes the configuration file to determine if the trace targets, trace data characteristics, or resource usage characteristics meet trace initiation criteria (Operation 208). In one or more embodiments, to prevent system overload, the APM agent may parse the configuration file and analyze the target method and/or trace method identified in the configuration file to estimate characteristics of a dataset to be generated by execution of the target method and/or trace method. In some embodiments the estimated characteristics includes an estimated size of the dataset to be generated by execution of the target method and/or trace method, and in other embodiments the estimated characteristics include an estimated amount of resources needed to execute the target method and/or trace method. In some embodiments, when the APM agent determines that the estimated characteristics of the data set meet a trace execution criteria, the APM agent configures the execution environment to execute the trace method at the start and/or finish of invocation of the target method. When the APM agent determines that the estimated characteristics of the dataset of the target method and/or trace method will exceed a threshold, the APM agent rejects the configuration file and refrains from configuring the execution environment to execute the trace method. In other embodiments although the APM agent rejects the configuration file, the execution environment is still configured to execute the trace method, and a notification is provided to the user warning of the potential for system overload upon execution of the trace method.

In some embodiments, configuring the execution environment to execute the trace method includes interweaving bytecode to trigger invocation of the trace method at the start and/or finish of invocation of the target method (Operation 210). More particularly, the APM agent uses bytecode weaving to inject bytecode into the bytecode of the application. In some embodiments, the injected bytecode is a simple call at the start and finish of the target method to another type in the APM agent code. In some embodiments the simple call at the invocation of the target method results in the APM agent reparsing the configuration file to identify additional parameters to be collected and commands to be executed by the APM agent.

In some embodiments, execution of the target method returns a current object and results in invocation of the trace method (Operation 212). As described above, in some embodiments the bytecode is configured to make a simple call to the APM agent to cause invocation of the trace method before and/or after invocation of the target method. In some embodiments the current object is used during execution of the trace method. In some embodiments, execution of the target method returns a string or an int.

In one or more embodiments, executing the trace method includes executing a reflective operation on the current object to generate a new object (Operation 214). As described in detail above, the use of reflection APIs allow a program to access information about itself. More particularly, reflection APIs may be used to invoke a method on the object generated by execution of the target method. By invoking a method on the object generated by the target method using reflection APIs a user may go deeper into the object.

In some embodiments, another reflective operation is executed using the object generated from the previous reflective operation (Operation 216). As with the first reflective operation, reflection APIs are used to invoke a method on the object generated by the previous reflective operation to generate a new object. One or more subsequent reflective operations may be performed on the object of the respective previous reflective operation. Reflective operations may be performed on the return of the previous reflective operation until the desired object is obtained or a reflective operation fails to return an object.

In some embodiments, the new object is transmitted for analysis (Operation 218). The new object, i.e., the result of the reflective operations, and the trace data, including all spans associated with the trace and other variables identified for capturing in the configuration file are transmitted to an APM engine for collection and analysis. In some embodiments the APM engine is located remote from the application server, e.g., on a cloud server.

In some embodiments, the APM engine includes one or more of a data collector, an analysis tool, a trace explorer, and a notification tool. The data collector of the APM engine collects the return object, as well as the tags and logs, and creates spans for the trace. In embodiments the spans are transmitted to the analysis tool for analysis, and then to the trace explorer to visually enhance the information and metrics provided by the analysis tool. The resulting performance information and metrics are presented to a user on a user interface. Analysis of the performance information and metrics permits users to identify bottlenecks and troubleshoot problems.

4. Example Default User-Configurable Configuration File

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3:
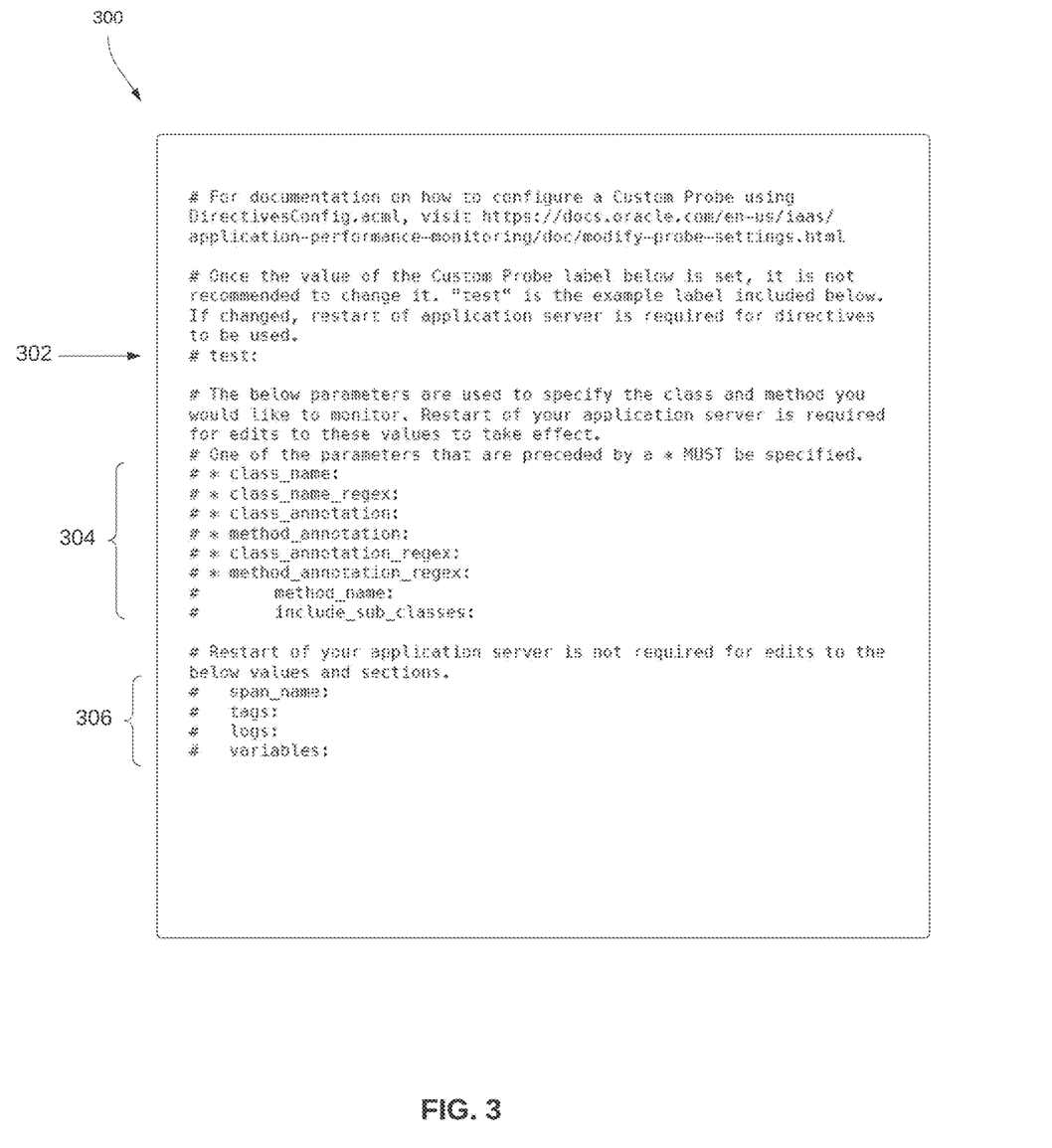
FIG. 3 illustrates an example default configuration file.

FIG. 3 illustrates an example of a default configuration file 300. In some embodiments and as illustrated, the configuration file is user configurable and is provided with comments instructing a user on customizing the configuration file. The default configuration file 300 includes a label 302, identified as "test", parameters 304, and additional data to be captured 306.

As illustrated in FIG. 3, the parameters 304 in the default configuration file 300 include class_name, class_name_regex, class_annoation, method_annotation, class_annotation_regex, method_annotation_regex, method_name, and include_sub_classes. Each of the parameters 304 is described in detail above. As noted in the comments in the default configuration file 300 preceding the parameters 304, these parameters are used to specify the class and method to be monitored, and restart of the application server is required for edits to these values to take effect. Additionally, the comments note that one of the first six parameters must be specified along with the method_name. As described in detail above, the purpose of this requirement is to prevent overloading the application server.

As illustrated in FIG. 3, the additional data to be captured 306 in the default configuration file 300 includes span_name, tags, logs, and variables. As noted in the comment preceding the additional data to be captured 306 in the default configuration file 300, restart of the application server is not required for edits to these values.

5. Example Configuration File

Figure 4B:
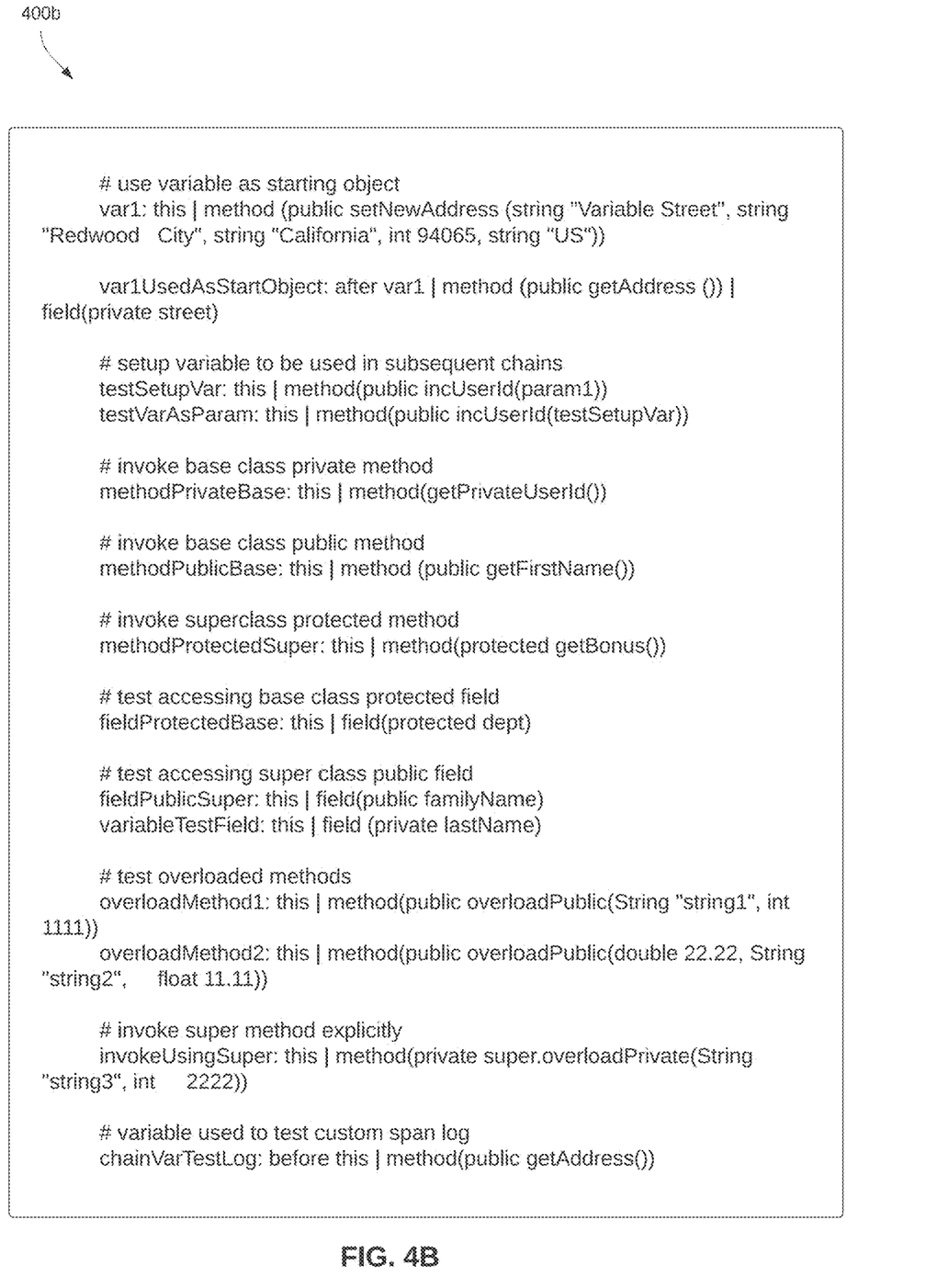

FIGS. 4A and 4B illustrate first and second pages of an example configuration file 400 for identifying a target method and class, and including a trace method for execution upon invocation of the target method and class. Although shown spanning two pages, the example configuration file 400 is a single document. The first line of the example configuration file 400 identifies the label as "test". The second line of the configuration file 400 identifies the class_name. The third line of the example configuration file 400 identifies the method_name. The fourth line of the example configuration file 400 identifies the span_name. The fifth line of the example configuration file 400 identifies the start of the tags section. A log section of the example configuration file 400 begins at line 19. A variables section of the example configuration file 400 begins at line 22. Comments are provided in the example configuration file 400 to guide a user's understanding of the information operations that can be performed and the data available to be captured.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
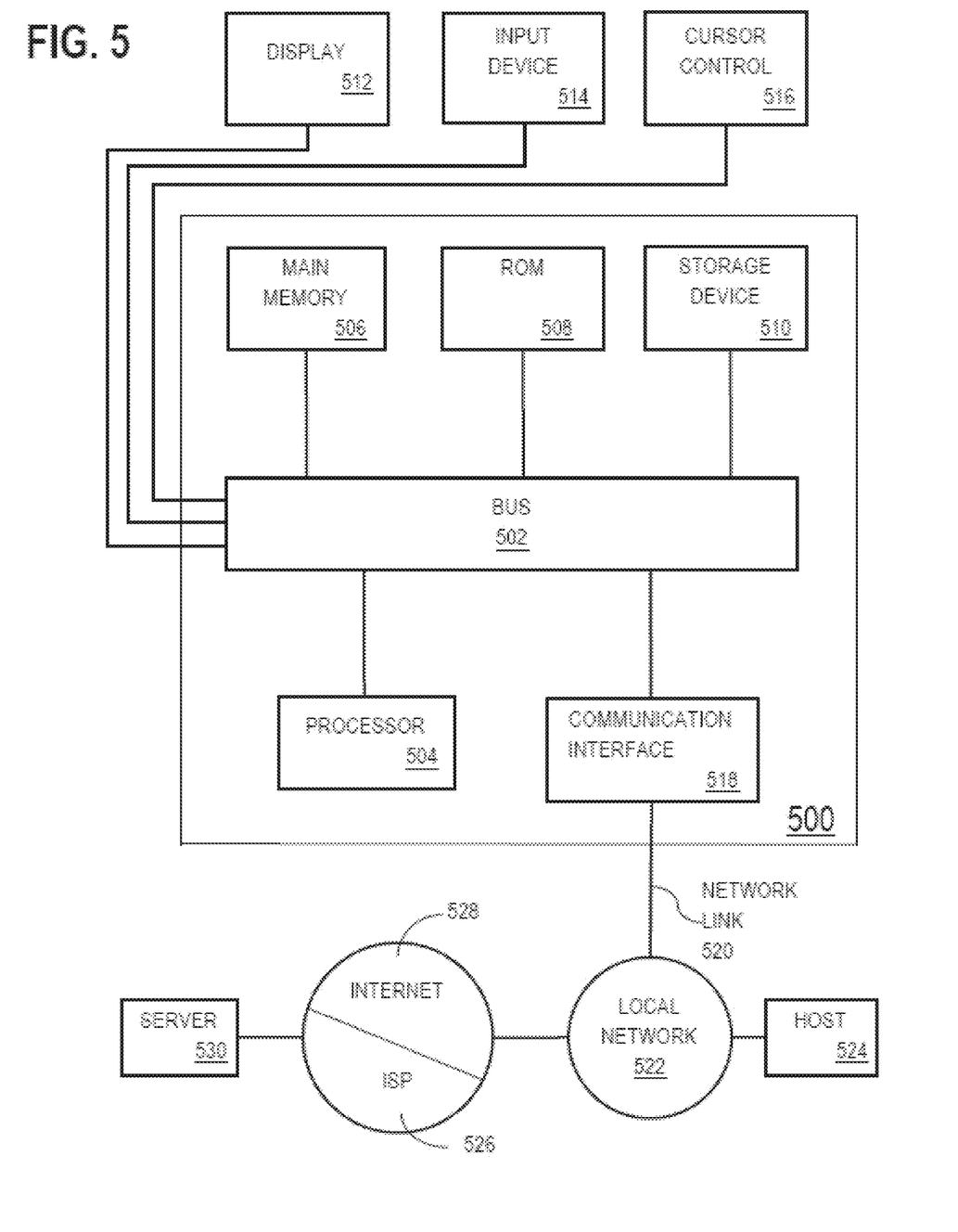
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable storage medium storing instructions, which when executed by one or more hardware processors, cause performance of operations comprising:
    determining, by an application performance monitoring agent, a first target method that is to be traced for analysis of an application;
    executing a monitoring operation to detect a type being loaded into an execution environment;
    analyzing the type being loaded into the execution environment to identify, by the application performance monitoring agent, the first target method in the type being loaded into the execution environment;
    configuring the execution environment to invoke a first trace method based on an invocation of the first target method to generate a first dataset,
    wherein invocation of the first trace method, based on the invocation of the first target method, comprises:
        executing the first trace method to access an object returned by the first target method, and
        executing the first trace method to perform a first reflective operation on the object returned by the first target method to generate the first dataset; and
    transmitting, by the application performance monitoring agent, the first dataset to an application performance monitoring engine for analysis of the application.

2. The non-transitory computer readable storage medium of claim 1, wherein performing the first reflective operation on the object returned by the first target method to generate the first dataset comprises:
    using reflection application programming interfaces (APIs) to invoke a first method on the object returned by the first target method to generate the first dataset.

3. The non-transitory computer readable storage medium of claim 1, wherein invocation of the first trace method further comprises performing a second reflective operation on the first dataset to generate a second dataset.

4. The non-transitory computer readable storage medium of claim 1, wherein configuring the execution environment to invoke the first trace method based on the invocation of the first target method includes injecting bytecode into bytecode of the application to utilize Open Tracing and Open Telemetry APIs.

5. The non-transitory computer readable storage medium of claim 1, wherein configuring the execution environment to invoke the first trace method based on the invocation of the first target method includes using bytecode weaving to inject code into code of the application at a start and an end of the first target method to invoke the first trace method each time the first target method is invoked.

6. The non-transitory computer readable storage medium of claim 1, wherein configuring the execution environment to invoke the first trace method based on the invocation of the first target method is responsive to determining that the first trace method meets a first trace execution criteria.

7. The non-transitory computer readable storage medium of claim 6, wherein determining that the first trace method meets the first trace execution criteria includes confirming that the first trace method identifies a class of the first target method.

8. The non-transitory computer readable storage medium of claim 6, wherein determining that the first trace method meets the first trace execution criteria includes:
 estimating characteristics of the first dataset to be generated by execution of the first trace method, wherein the estimated characteristics of the first dataset comprise an estimated size of the first dataset; and
 determining the estimated size of the first dataset is below a threshold,
 wherein configuring the execution environment to invoke the first trace method is based on the invocation of the first target method is responsive to determining the estimated size of the first dataset is below the threshold.

9. The non-transitory computer readable storage medium of claim 6, wherein determining that the first trace method meets the first trace execution criteria includes:
 estimating characteristics of the first dataset to be generated by execution of the first trace method, wherein the estimated characteristics of the first dataset comprise an estimated amount of resources necessary to generate the first dataset; and
 determining the estimated amount of resources necessary to generate the first dataset is below a threshold,
 wherein configuring the execution environment to invoke the first trace method is based on the invocation of the first target method is responsive to determining the estimated amount of resources necessary to generate the first dataset is below the threshold.

10. The non-transitory computer readable storage medium of claim 1, wherein the operations further comprise:
 determining, by the application performance monitoring agent, a second target method that is to be traced for analysis of the application;
 identifying, by the application performance monitoring agent, the second target method in a type being loaded into the execution environment; and
 responsive to determining that the second target method does not meet a first trace execution criteria, refraining from configuring the execution environment to invoke the second target method based on the invocation of the first target method.

11. A non-transitory computer readable storage medium storing instructions, which when executed by one or more hardware processors, cause performance of operations comprising:
 receiving a user-defined configuration file comprising instructions for executing a first trace method for tracing a first target method of an application;
 analyzing, by an application performance monitoring agent, the user-defined configuration file to identify the first trace method and the first target method;
 executing a monitoring operation to detect a type being loaded into an execution environment;
 analyzing the type being loaded into the execution environment to identify, by the application performance monitoring agent, the first target method in the type being loaded into the execution environment;
 configuring the execution environment to invoke the first trace method based on an invocation of the first target method to generate a first dataset,
 wherein invocation of the first trace method, based on the invocation of the first target method, comprises:
  executing the first trace method to access an object returned by the first target method, and
  executing the first trace method to perform a reflective operation on the object returned by the first target method to generate the first dataset; and
 transmitting, by the application performance monitoring agent, the first dataset to an application performance monitoring engine for analysis of the application.

12. The non-transitory computer readable storage medium of claim 11, wherein the operations further comprise:
 determining that the first trace method meets a first trace execution criteria at least by confirming that the first trace method identifies a type of the first target method.

13. The non-transitory computer readable storage medium of claim 11, wherein the operations further comprise:
 determining that the first trace method meets a first trace execution criteria at least by estimating characteristics of the first dataset to be generated by execution of the first trace method.

14. The non-transitory computer readable storage medium of claim 13, wherein the estimated characteristics of the first dataset to be generated by execution of the first trace method comprise an estimated size of the first dataset, and wherein determining that the first trace method meets the first trace execution criteria comprises determining that the estimated size of the first dataset exceeds a threshold value.

15. The non-transitory computer readable storage medium of claim 14, wherein the estimated characteristics of the first dataset to be generated by execution of the first trace method comprise an estimated amount of resources necessary to generate the first dataset, and wherein determining that the first trace method meets the first trace execution criteria comprises determining that the estimated amount of resources necessary to generate the first dataset exceeds a threshold value.

16. The non-transitory computer readable storage medium of claim 13, wherein the operations further comprise:
 analyzing, by the application performance monitoring agent, the user-defined configuration file to identify a second trace method and a second target method of the application;
 identifying, by the application performance monitoring agent, the second target method in a type being loaded into the execution environment;
 determining that the second trace method exceeds a second trace execution criteria at least by estimating characteristics of the first dataset to be generated by execution of the second trace method; and
 refraining from configuring the execution environment to invoke the second trace method.

17. The non-transitory computer readable storage medium of claim 16, wherein the estimated characteristics of the first dataset to be generated by execution of the second trace method comprise an estimated size of the first dataset, and wherein determining that the second trace method exceeds the second trace execution criteria comprises determining that the estimated size of the first dataset exceeds a threshold value.

18. The non-transitory computer readable storage medium of claim 16, wherein the estimated characteristics of the first dataset to be generated by execution of the second trace method comprise an estimated amount of resources necessary to generate the first dataset, and wherein determining that the second trace method meets the second trace execution criteria comprises determining that the estimated amount of resources necessary to generate the first dataset exceeds a threshold value.

19. The non-transitory computer readable storage medium of claim 16, wherein the operations further comprise:
   providing an alert indicating that execution of the second trace method exceeds the second trace execution criteria.

20. The non-transitory computer readable storage medium of claim 19, wherein providing the alert indicating that execution of the second trace method exceeds the second trace execution criteria includes identifying the estimated characteristics of the first dataset that exceed the second trace execution criteria.

21. A method comprising:
   determining, by an application performance monitoring agent, a target method that is to be traced for analysis of an application;
   executing a monitoring operation to detect a type being loaded into an execution environment;
   analyzing the type being loaded into the execution environment to identify, by the application performance monitoring agent, the target method in the type being loaded into the execution environment;
   configuring the execution environment to invoke a trace method based on an invocation of the target method to generate a first dataset,
   wherein invocation of the trace method, based on the invocation of the target method, comprises:
      executing the trace method to access an object returned by the target method, and
      executing the trace method to perform a reflective operation on the object returned by the target method to generate the first dataset; and
   transmitting, by the application performance monitoring agent, the first dataset to an application performance monitoring engine for analysis of the application.

* * * * *